US012545311B2

(12) United States Patent
Barbeau et al.

(10) Patent No.: US 12,545,311 B2
(45) Date of Patent: Feb. 10, 2026

(54) LINKAGE FOR HAULING MATERIAL HANDLING EQUIPMENT

(71) Applicant: PRATT & WHITNEY CANADA CORP., Longueuil (CA)

(72) Inventors: Jean-Yves Barbeau, St-Mathieu-de-Laprairie (CA); Pierre-Luc Lachance, Brossard (CA); Jonathan Laflamme, Longueuil (CA); Daniel Goyette, St-Amable (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 841 days.

(21) Appl. No.: 17/451,006

(22) Filed: Oct. 15, 2021

(65) Prior Publication Data

US 2023/0121111 A1    Apr. 20, 2023

(51) Int. Cl.
*B62B 5/00*    (2006.01)
(52) U.S. Cl.
CPC ........ *B62B 5/0079* (2013.01); *B62B 2207/02* (2013.01)
(58) Field of Classification Search
CPC ..... B62B 5/0079; B62B 2207/02; B60D 1/40; B60D 1/1675; B60D 1/187
See application file for complete search history.

(56) References Cited

U.S. PATENT DOCUMENTS

| | | | | | |
|---|---|---|---|---|---|
| 2,474,690 | A | * | 6/1949 | Robinson | B08B 9/0436 |
| | | | | | 138/131 |
| 2,797,934 | A | * | 7/1957 | Helgeson | B60D 1/155 |
| | | | | | 280/489 |
| 2,854,893 | A | * | 10/1958 | Henshall | B60R 1/06 |
| | | | | | D12/189 |
| 3,999,730 | A | * | 12/1976 | Gonsalves | E01B 25/26 |
| | | | | | 403/220 |
| 4,125,272 | A | * | 11/1978 | Putnam, Jr. | B60D 1/40 |
| | | | | | 280/479.3 |
| 4,350,362 | A | * | 9/1982 | Landers | B60D 1/40 |
| | | | | | 280/479.3 |

(Continued)

FOREIGN PATENT DOCUMENTS

GB    2577886 A  *  4/2020 ............. B60D 1/167

OTHER PUBLICATIONS

European Search Report issued in counterpart application 22201144.7 on Mar. 13, 2023.

*Primary Examiner* — Vishal R Sahni
(74) *Attorney, Agent, or Firm* — Norton Rose Fulbright Canada LLP (57) ABSTRACT

A linkage for interconnecting material handling equipment of a convoy is provided. The linkage comprises a rod having first and second opposite ends, a first pivot joint between the first end and the second end, the first pivot joint having a first pivot axis extending transversely to a longitudinal axis of the rod. A biasing member is secured to the rod and deformable upon rotation of the first pivot joint about the first pivot axis. The biasing member resists at least partially to the rotation of the first pivot joint about the first pivot axis. A first coupling and a second coupling are respectively pivotally mounted to the first end and the second end of the rod for rotation about respective pivot axes transverse to both the longitudinal axis of the rod and the first pivot axis.

15 Claims, 9 Drawing Sheets

(56) References Cited

U.S. PATENT DOCUMENTS

| | | | | |
|---|---|---|---|---|
| 4,352,327 A * | 10/1982 | Sleep | B61B 10/04 | 104/170 |
| 4,529,937 A * | 7/1985 | Cornelius | G01V 3/15 | 74/25 |
| 4,792,153 A * | 12/1988 | Galdes | B60D 1/40 | 280/479.3 |
| 4,841,621 A * | 6/1989 | Harry | B23Q 1/0009 | 464/170 |
| 5,118,127 A * | 6/1992 | Partington | A61G 7/05 | 280/483 |
| 5,288,095 A * | 2/1994 | Swindall | B60D 1/40 | 280/479.2 |
| 5,445,471 A * | 8/1995 | Wexler | F16C 11/12 | 16/280 |
| 5,630,606 A * | 5/1997 | Ryan | B60D 1/52 | 280/479.3 |
| 5,666,100 A * | 9/1997 | MacDonald | H01C 10/40 | 338/202 |
| 5,803,647 A * | 9/1998 | Hughes | E04F 11/1836 | 403/291 |
| 6,328,047 B1 * | 12/2001 | Lee | A45B 17/00 | 403/291 |
| 6,371,465 B1 * | 4/2002 | Willis | F16F 1/06 | 267/169 |
| 6,516,957 B1 * | 2/2003 | Harkinson | A47H 1/02 | 403/291 |
| 6,810,890 B2 * | 11/2004 | Lin | A63B 60/62 | 135/25.4 |
| 6,857,652 B2 * | 2/2005 | Dougherty | B60D 1/60 | 280/507 |
| 7,537,016 B1 * | 5/2009 | You | A45B 3/00 | 135/25.4 |
| 8,360,459 B2 | 1/2013 | Holtan | | |
| 8,979,900 B2 * | 3/2015 | Jahng | A61B 90/39 | 606/255 |
| 9,073,198 B1 * | 7/2015 | Menius | B25G 1/06 | |
| 11,110,947 B2 | 9/2021 | Finstad et al. | | |
| 11,491,834 B1 * | 11/2022 | Gabriel | B60D 1/075 | |
| 2005/0218617 A1 | 10/2005 | Frahm | | |
| 2012/0112433 A1 * | 5/2012 | Williams, Jr. | B60D 1/06 | 280/490.1 |
| 2015/0191062 A1 * | 7/2015 | Fincher | B60D 1/44 | 280/474 |
| 2015/0191063 A1 * | 7/2015 | Fincher | B60D 1/54 | 280/474 |
| 2016/0082796 A1 * | 3/2016 | Fincher | B60D 1/54 | 280/474 |
| 2019/0263203 A1 * | 8/2019 | Perotti | B60D 1/54 | |
| 2019/0299730 A1 * | 10/2019 | Gabriel | B60D 1/18 | |
| 2021/0291599 A1 * | 9/2021 | Bowe | B60D 1/167 | |
| 2021/0387492 A1 * | 12/2021 | Ward | B60D 1/488 | |

* cited by examiner

FIG_1

FIG_2

FIG_7

FIG. 9

LINKAGE FOR HAULING MATERIAL HANDLING EQUIPMENT

TECHNICAL FIELD

The application relates generally to material handling equipment and, more particularly, to carriages and linkages for hauling convoy of carriages such as carts and trolleys.

BACKGROUND OF THE ART

In facilities such as manufacturing facilities, warehouses, or more generally on large scale sites, material such as production material and manufactured parts may have to be carried around from one location to another. For instance, in aircraft engine production facilities, production equipment and/or parts (e.g. engine parts) may be carried from one location to another between machine stations, storage, etc. Convoys of material handling equipment, such as carts and trolleys may be used to handle and carry such material. These convoys may be hauled using powered industrial vehicles (PIV). During hauling, there may be risks of injuries and/or damages to equipment being carried with unstable, loose and/or unreliable linkages interconnecting carriages of a convoy, or a carriage and the PIV.

SUMMARY

In one aspect, there is provided a linkage for interconnecting material handling equipment of a convoy adapted to be displaced on a floor, the linkage comprising: a rod having a first end and a second end opposite the first end, a first pivot joint defined between the first end and the second end, the first pivot joint having a first pivot axis extending transversely to a longitudinal axis of the rod, a biasing member secured to the rod, the biasing member deformable upon rotation of the first pivot joint about the first pivot axis, the biasing member at least partially resisting to the rotation of the first pivot joint about the first pivot axis; and a first coupling and a second coupling respectively pivotally mounted to the first end and the second end of the rod for rotation about respective pivot axes transverse to both the longitudinal axis of the rod and the first pivot axis.

In another aspect, there is provided a linkage for interconnecting material handling equipment of a convoy adapted to be displaced on a floor, the linkage comprising: a rod having a first end and a second end opposite the first end, a first pivot joint defined between the first end and the second end, the first pivot joint having a first pivot axis extending transversely to a longitudinal axis of the rod, a second pivot joint defined at the first end of the rod and a third pivot joint defined at the second end of the rod, the second pivot joint having a second pivot axis, the third pivot joint having a third pivot axis, the second pivot axis and the third pivot axis transverse to the longitudinal axis of the rod and transverse to the first pivot axis; a biasing member secured to the rod, the biasing member deformable upon rotation of the first pivot joint about the first pivot axis, the biasing member at least partially resisting to the rotation of the first pivot joint about the first pivot axis; and a first coupling at the first end of the rod and a second coupling at the second end of the rod, the first coupling defining part of the second pivot joint and the second coupling defining part of the third pivot joint.

DESCRIPTION OF THE DRAWINGS

Reference is now made to the accompanying figures in which.

DETAILED DESCRIPTION

Figure 1:
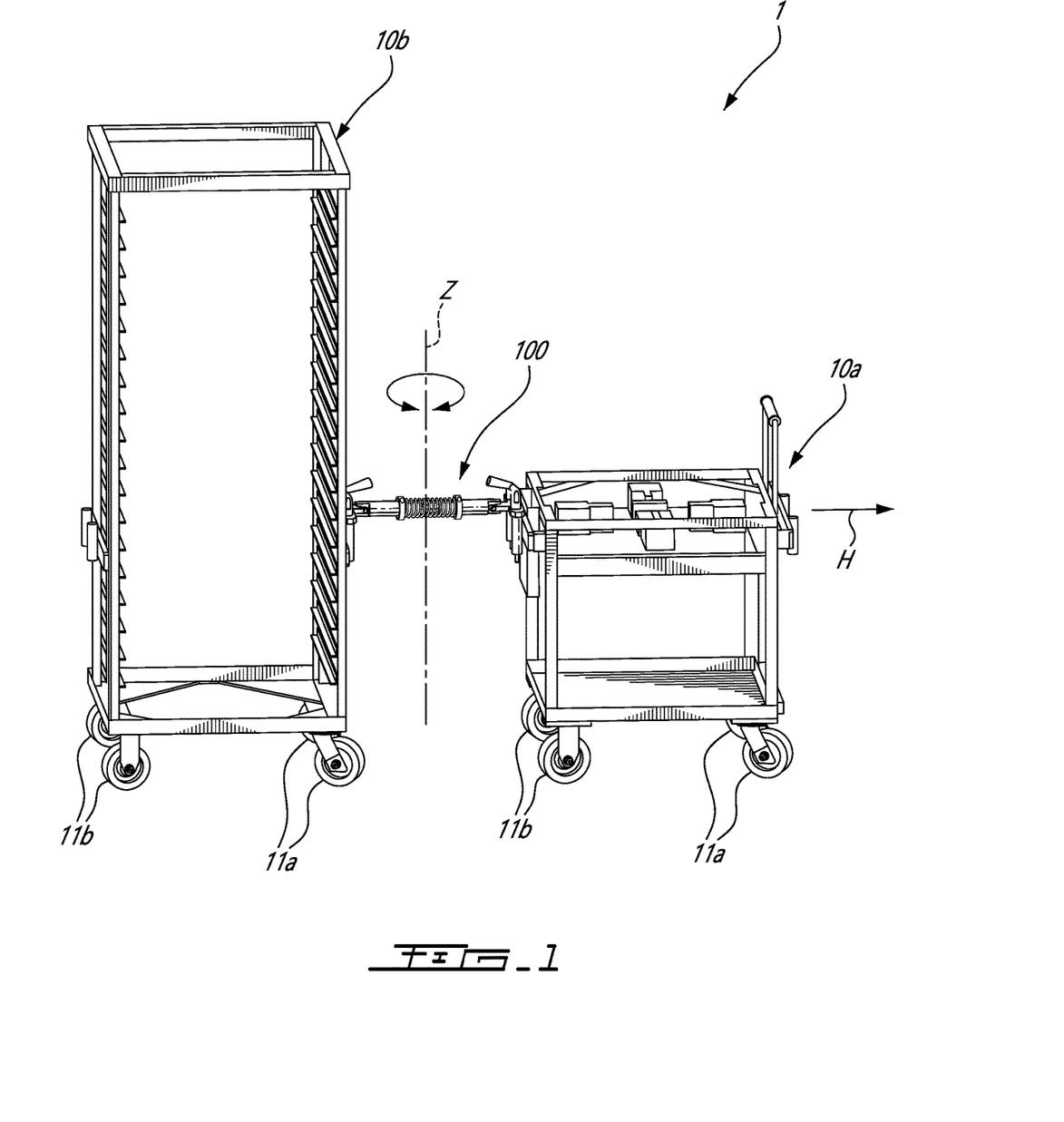
FIG. 1 is a perspective view of a convoy of material handling equipment interconnected by an exemplary linkage, according to an embodiment.

FIG. 1 illustrates a convoy 1 of material handling equipment 10a, 10b. Such convoy 1 of material handling equipment 10a, 10b may be used in facilities, such as manufacturing facilities, warehouse, sites, or the like, to carry equipment/articles from one location to another. Material handling equipment 10a, 10b such as those shown may be referred to as carts, trolleys dollies, etc. The material handling equipment 10a, 10b may include racks, trays, shelves, platforms, for instance, to carry different types of material. Material handling equipment 10a, 10b may have rollers, wheels, casters or other floor/ground contacting components for displacement on the floor/ground. For convenience, trolley 10a, 10b will generally be used throughout the disclosure to refer to the exemplary material handling equipment such as those shown in FIG. 1. Such a convoy 1 may have more than two interconnected trolleys 10a, 10b (e.g. three, four, five . . . ). Although not shown, a powered industrial vehicle (PIV), which may be referred to as a "tugger", or tow tractor, for instance, may be used to haul ("pull") the convoy 1. A hauling direction H is illustrated by an arrow in FIG. 1.

During hauling, the convoy 1 may follow a curved trajectory, for instance when the PIV turns a corner. A relative angular position of the trolleys 10a, 10b may vary to follow such curved trajectory. Adjacent trolleys 10a, 10b are connected one to another via a linkage 100. As will be seen hereinafter, the linkage is configured to allow the trolleys 10a, 10b to move, angularly, relative to each other about an axis Z, normal to the ground. In other words, a relative orientation of adjacent trolleys 10a, 10b may vary as the convoy 1 changes its trajectory (e.g. from a straight trajectory to a curved trajectory, or vice versa). In the depicted embodiment, the trolleys 10 have a plurality of casters 11a, 11b. As shown, the trolleys 10a, 10b have a set of swivel casters 11a at one end and a set of unidirectional casters 11b at the other end. In the convoy 1, the trolleys 10a, 10b are oriented so as to have their respective swivel casters 11 at the front of the trolleys 10a, 10b, with reference to the hauling direction H.

Figure 2:
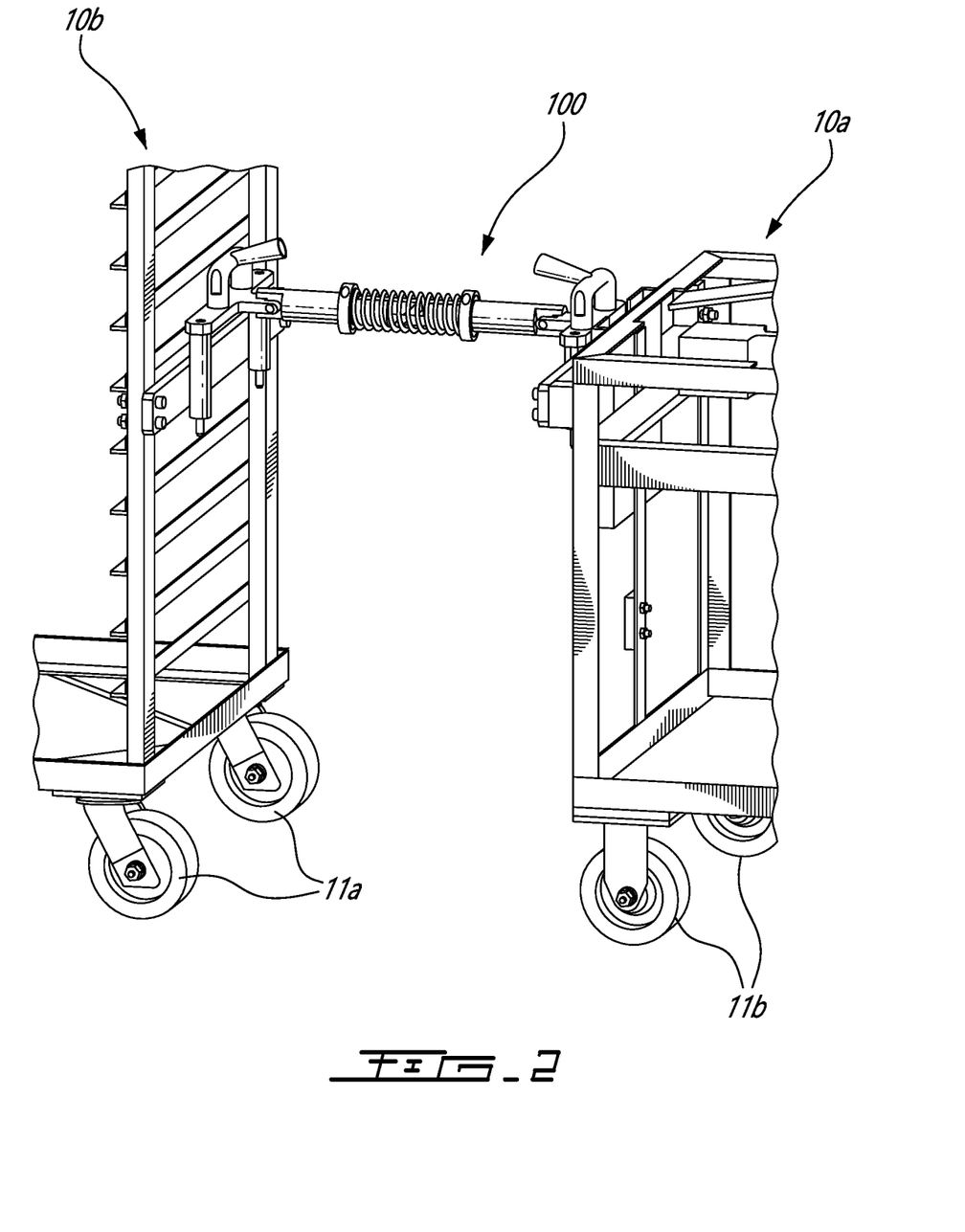
FIG. 2 is a magnified perspective view of the linkage interconnecting the material handling equipment shown in FIG. 1.

Referring to FIG. 2, the linkage 100 connects one trolley 10a to another trolley 10b. As will be seen hereinafter, the linkage 100 may be configured to transmit tension and compression loads between the interconnected trolleys 10a, 10b. For instance, during hauling, a trolley 10a may pull a subsequent trolley 10b connected thereto via the linkage 100, thereby creating a tension load in the linkage 100. Upon decelerating or braking the convoy 1, a compression load may be induced in the linkage 100. In at least some embodiments, the linkage 100 is rigid so as to maintain its overall length if pulled or compressed as in the above scenarios. In the depicted embodiment, the linkage 100 has a fixed length, i.e. not extendable upon application of a tension load and/or not compressible upon application of a compression load in a lengthwise direction.

The linkage 100 may also be configured to assist in controlling the alignment between adjacent trolleys 10a, 10b during hauling, either when the convoy 1 moves along a straight trajectory or along a curved trajectory. The linkage 100 is articulated to allow relative movement between interconnected trolleys 10a, 10b. As will be seen hereinafter, the linkage 100 is configured to maintain the trolleys 10a, 10b at a minimum distance when interconnected to avoid collision between adjacent trolleys 10 in the hauling direction H while allowing a relative angular movement of the interconnected trolleys 10 about the axis Z.

Now referring more particularly to FIGS. 3 to 6, the exemplified linkage 100 includes an articulated rod 101 (or simply "rod 101") with rod segments 101A, 101B interconnected via a pivot joint 102 having a pivot axis 103 extending along the axis Z to allow a pivotal movement of the interconnected trolleys 10a, 10b about the axis Z. The rod 101 extends lengthwise from one end 101E to another opposite end 101F. The rod 101 has a longitudinal axis 101X, which extends along a center line of the rod 101. The rod 101 remains straight (or substantially straight) while the convoy 1 has a straight trajectory, and the rod segments 101A, 101B define an angle, which may vary as the convoy 1 initiates a curved trajectory.

The rod 101 may also be referred to as an articulated tow bar. During hauling, the pivot joint 102 allows interconnected trolleys 10a, 10b of the convoy 1 to change their relative orientation so as to follow a curved trajectory, for instance, when the hauled convoy 1 turns a corner.

As shown, the pivot axis 103 is disposed midway between the opposed ends 101E, 101F of the rod 101. Locating the pivot joint 102 and/or axis 103 at an equal distance from each one of the interconnected trolleys 10a, 10b may provide a greater stability of the convoy 1 during hauling. Locating the pivot joint 102 at a center of the rod 101 may also simplify the design and/or manufacturing of the linkage 100. For instance, the rod segments 101A, 101B may be symmetrical and/or interchangeable. This may limit the manufacturing costs and the complexity of the design. The length of the rod segments 101A, 101B may be measured from the pivot joint 102, located at one end of the rod segment, to an opposite end of such rod segment. Such opposite end may be one of the rod ends 101E, 101F discussed above. However, it is understood that the pivot joint 102 may be offset relative to the center of the rod 101 in other embodiments.

The pivot joint 102 has a single degree of freedom in rotation. In at least some embodiments, such as the one shown, the single degree of freedom in rotation is the only degree of freedom of movement at the pivot joint 102. In other words, the pivot joint 102 is rigid in all other degree of freedom so as to limit the relative movement between the rod segments 101A, 101B to a rotation about the pivot axis 103.

Figure 4:
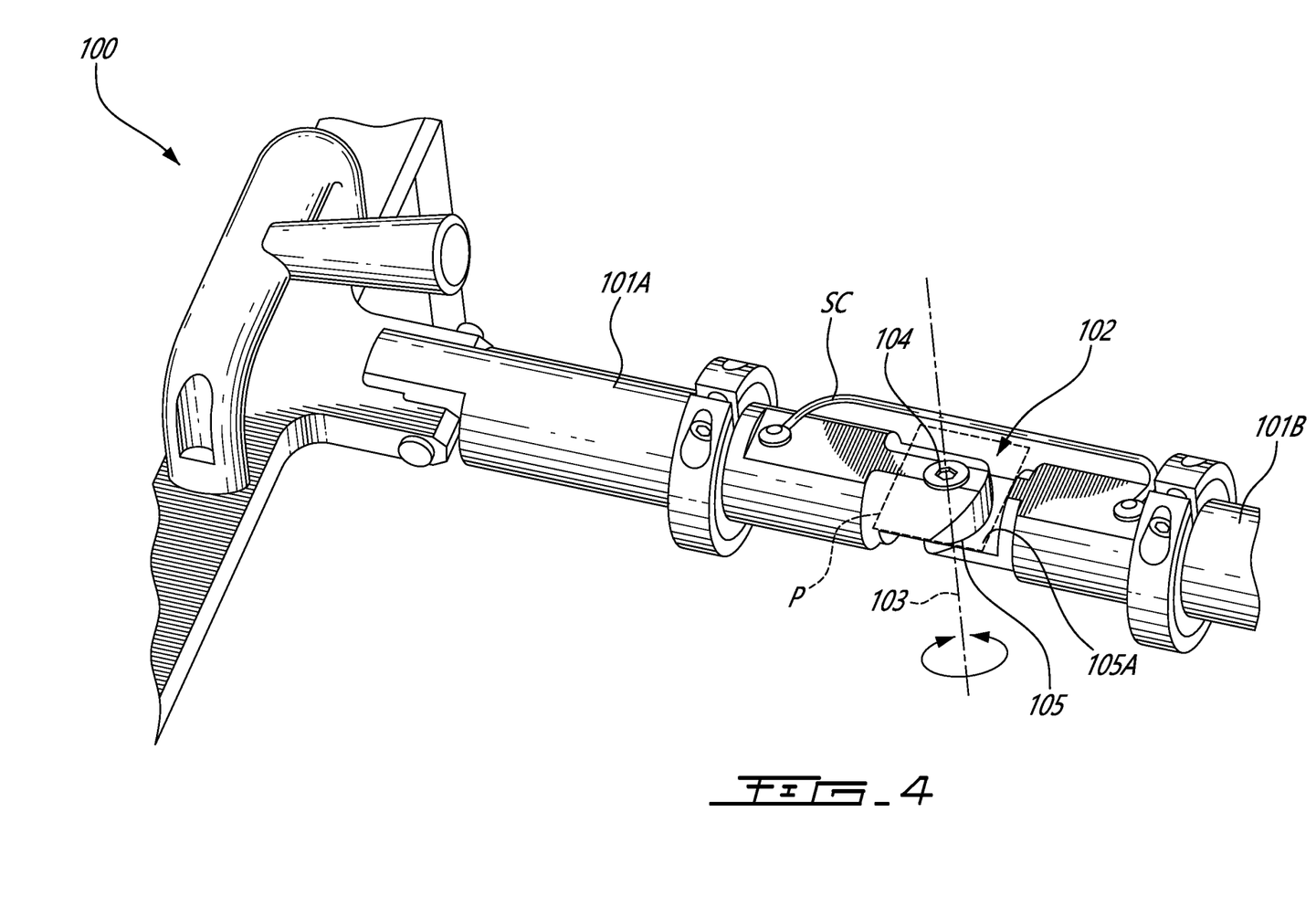
FIG. 4 is a magnified perspective view of a portion of the linkage of FIGS. 1 to 3, with a component hidden.

As shown in FIG. 4, in the depicted embodiment, the pivot joint 102 includes an axle 104. The axle 104 coextends with the pivot axis 103. The axle 104 defines the rotation axis 103 of the pivot joint 102. In the depicted embodiment, the rod segments 101A, 101B are connected to each other via the axle 104. In the depicted embodiment, the axle 104 extends through the rod segments 101A, 101B. The axle 104 may be a bolt, a pin (with or without threads), or other rigid axles. The axle 104 may be part of a rod segment in some embodiments. For instance, one, or each, rod segment 101A, 101B may define at least part of the axle 104 in some embodiments. The axle 104 may be defined by interlocking and/or complementary features of the rod segments 101A, 101B, for instance. The axle 104 may be lubricated or self-lubricated in at least some embodiments. While the axle 104 allows rotation of the rod segments 101A, 101B one relative to another, the axle 104 may also support shearing resulting from tension/compression loads in the linkage 100. The dimension of the axle 104 may be selected to support such shearing, induced in the axle 104 during hauling.

With additional reference to FIG. 4, the rod segments 101A, 101B overlap at the pivot joint 102. The axle 104 connects one rod segment 101A to the other rod segment 101B at an interface 105 between the rod segments 101A, 101B. As shown, the interface 105 includes a mating surface 105A on each rod segment 101A, 101B. The mating surface 105A of each rod segment 101A, 101B contacts each other at the pivot joint 102. There may be an intermediary component, e.g. washer, bearing, such as plain or sliding bearing, or other friction control or wearing part between the mating surface 105A of the rod segments 101A, 101B in other embodiments. In the depicted embodiment, the interface 105 extends in a plane P normal to the pivot axis 103 and/or the axis Z. While the mating surfaces 105A of the rod segments 101A, 101B may be flat surfaces extending in the plane P, in at least some embodiments, the mating surface 105A of the rod segments 101A, 101B may have other shapes (e.g. concave and convex mating surfaces, such as a ball joint, convex to convex surfaces), as other possibilities.

Also shown in FIG. 4, in at least some embodiments, a safety cable SC links one rod segment to another. The safety cable SC is secured to each one of the rod segments 101A, 101B. If the axle 104 were removed, for maintenance for instance, the safety cable SC could maintain a connection between the rod segments 101A, 101B.

Figure 5:
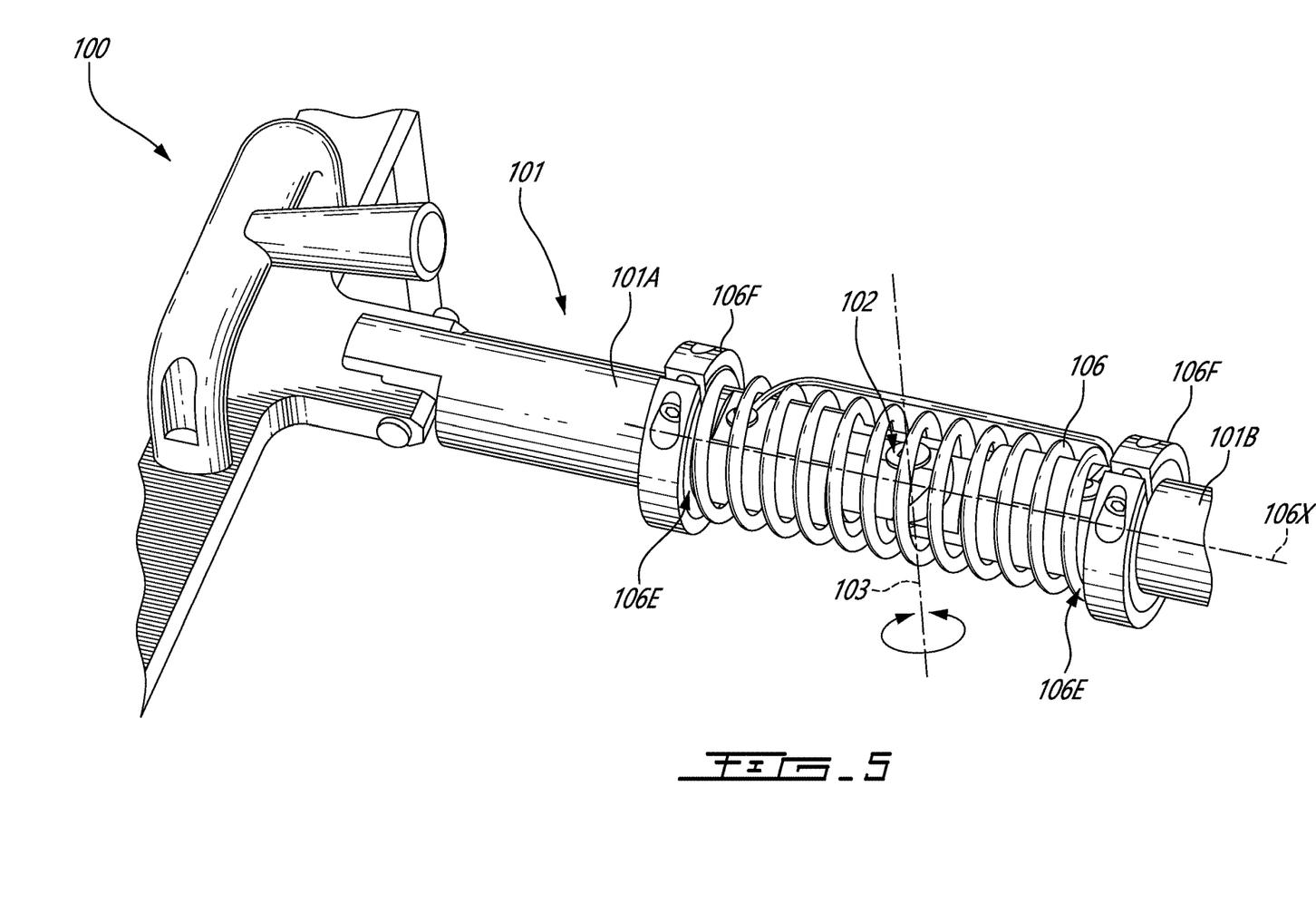
FIG. 5 is a magnified perspective view of the portion of the linkage of FIG. 4.

Referring to FIG. 5, the linkage 100 includes a stabilizer which may be embodied in the form of a biasing member 106 deformable upon rotation of the pivot joint 102 about the pivot axis 103. In the absence of external forces, the biasing member 106 maintains the rod segments 101A, 101B aligned along axis 101X. The biasing member 106 resists at least partially to loads inducing the pivoting at the pivot joint 102. The biasing member 106 may thus control the rotation at the pivot joint 102. By controlling and/or limiting the pivoting at the pivot joint 102, the trajectory of the convoy 1 may be better maintained during hauling. In particular, the biasing member 106 controlling the pivoting at the pivot joint 102 may limit an oscillating motion, also referred to as swaying, between the interconnected trolleys 10a, 10b when they are in motion. As the convoy 1 gets longer (three, four, five, or more trolleys 10a, 10b . . . ), stabilizing and/or limiting such oscillating movement (movement in a direction normal to the hauling direction H) of the trolleys 10 may result in a more controllable and/or safer convoy 1 during hauling.

The biasing member 106 may also assist in preventing the pivot joint 102 from pivoting freely during handling of the linkage 100 by a worker, during maintenance, or other situations requiring handling of the linkage 100.

In the depicted embodiment, the biasing member 106 is tubular and extends about the pivot joint 102. The biasing member 106 extends along the rod 101 in overlapping relationship with the pivot joint 102. As shown, the rod 101 extends through the biasing member 106. In a particular embodiment, the biasing member 106 is concentric with the rod 101. The biasing member 106 extends along at least part of the rod segments 101A, 101B. By so fitting the biasing member 106 over the rod segments 101A, 101B, the biasing member 106 may also act as a protective sleeve to protect the pivot joint 102 against impacts from an exterior environment. As shown, the biasing member 106 may conceal, at least partially, the pivot joint 102, and/or define a shield or barrier against impacts from an object of an exterior environment for the pivot joint 102.

In the depicted embodiment, the biasing member 106 is secured at opposed ends thereof to respective ones of the rod segments 101A, 101B. The biasing member 106 is elongated, and extends about at least part of the respective rod segments 101A, 101B. The biasing member 106 has a longitudinal axis 106X extending between opposite ends 106E thereof. The longitudinal axis 106X intersects with the pivot axis 103. In use, upon movement of the rod segments 101A, 101B relative to each other about the pivot axis 103, the biasing member 106 may bend (or otherwise deform, such as bowing, compressing and/or shearing) in a direction transverse to its longitudinal axis 106X when a force causing a pivotal movement at the pivot joint 102 is induced to the linkage 100. The biasing member 106 is resilient. When deformed, such as by the bending discussed above, the biasing member 106 may resist, at least partially, to the force inducing the deformation to return to its shape/position at rest as such force diminishes and/or is being removed.

It may be desirable, for security reasons and/or stability of the convoy 1 during hauling, for instance, to limit a radius of curvature of the trajectory between interconnected trolleys 10. During hauling, as the interconnected trolleys 10a, 10b initiate a turn, the rod segments 101A, 101B may pivot about the pivot axis 103, at the pivot joint 102. An angular position between the rod segments 101A, 101B may be limited to a range of angular positions. As such, a relative orientation of adjacent interconnected trolleys 10a, 10b may be limited. The maximum angular position may depend on a ratio between the length of the rod 101 and a width of the trolley 10a, 10b (e.g. from the widest one of the trolleys if not equal). For instance, in at least some embodiments where the rod segments 101A, 101B have a same length, the range of angular positions between the rod segments 101A, 101B about the pivot axis 103 may be selected based on the following equation: $\theta=180°-2*[ARCTAN((B/2)/A)]$, where B=width of the trolley 10a, 10b (widest, if not equal), and A=a length of the rod segment 101A, 101B, where $\theta$ is the maximum angular position. For instance, in such case, the range of angular position may be between 0° and 90° (inclusively), where 0° corresponds to a position where the rod segments 101A, 101B are aligned, and 90° may be clockwise and counterclockwise about the pivot axis 103 starting off of the 0° position. In other cases, for instance where the rod segments 101A, 101B are each smaller than half of the width of trolley 10a, 10b, the maximum angular position may be smaller than 90°, for instance between 0° and 60°, or even less, such as 0° and 30°. Limiting the angular position based on the ratio discussed above may limit the propensity of the trolleys 10 to flip over or contact each other during a tight turn of the convoy 1.

Limiting the radius of curvature of the trajectory of the convoy 1 may avoid/limit collisions between trolleys 10a, 10b of the convoy 1, between them, with external objects, or with people in the vicinity of the convoy 1. The biasing member 106 may assist in limiting the radius of curvature of the trajectory of the convoy 1. The range of angular positions may be limited (upper limit) by the biasing member 106. For instance, in the depicted embodiment, the biasing member 106 may deform by bending (or otherwise) until the rod segments 101A, 101B and/or parts of the pivot joint 102 hinder the bending of the biasing member 106. The hindering may occur as the biasing member 106, in a deformed state, abuts against the rod segments 101A, 101B and/or parts of the pivot joint 102. Limiting the range of angular positions may be obtained otherwise, such as by an abutment between portions of the rod segments 101A, 101B.

In the depicted embodiment, the biasing member 106 is a coil spring, which may or may not be pre-compressed when assembled as part of the linkage 100. The coil spring is secured (at least axially) at its opposite ends 106E to a respective one of the rod segments 101A, 101B. In the depicted embodiment, lock rings 106F are secured to a respective one of the rod segments 101A, 101B. The biasing member 106, here coil spring, extends between the lock rings 106F. The lock rings 106F define axial abutments at opposing ends of the biasing member 106. As shown, the biasing member 106 rests axially against the lock rings 106F. The lock rings 106G may radially secure the coil spring in addition to the axial securing, in some embodiments. The lock rings 106G removably secure the biasing member 106 to the rod 101. This may facilitate assembly/disassembly and/or maintenance of the linkage 100. The biasing member 106 may be permanently secured to the rod 101 in other embodiments. Other securing means may be contemplated to secure the biasing member 106 to the rod 101 (e.g. other types of stoppers, fasteners, welds, adhesives, etc.).

While shown as a coil spring, other biasing member 106 may be contemplated, with such biasing member restricting the pivoting at the pivot joint 102. A mechanical resistance against the pivoting at the pivot joint 102 may be obtained differently. For instance, it may be obtained by torsion of a biasing member, which may be integrated into the pivot joint 102, such as a spring pivot. Other examples of biasing member 106 may include a torsion spring, a leaf spring, a deformable pin or tube, metallic and/or elastomeric, or other types of biasing member, whether or not integrated into the pivot joint 102, such as a pneumatic cylinder fixed at opposite ends to respective ones of the rod segments 101A, 101B.

Figure 6:
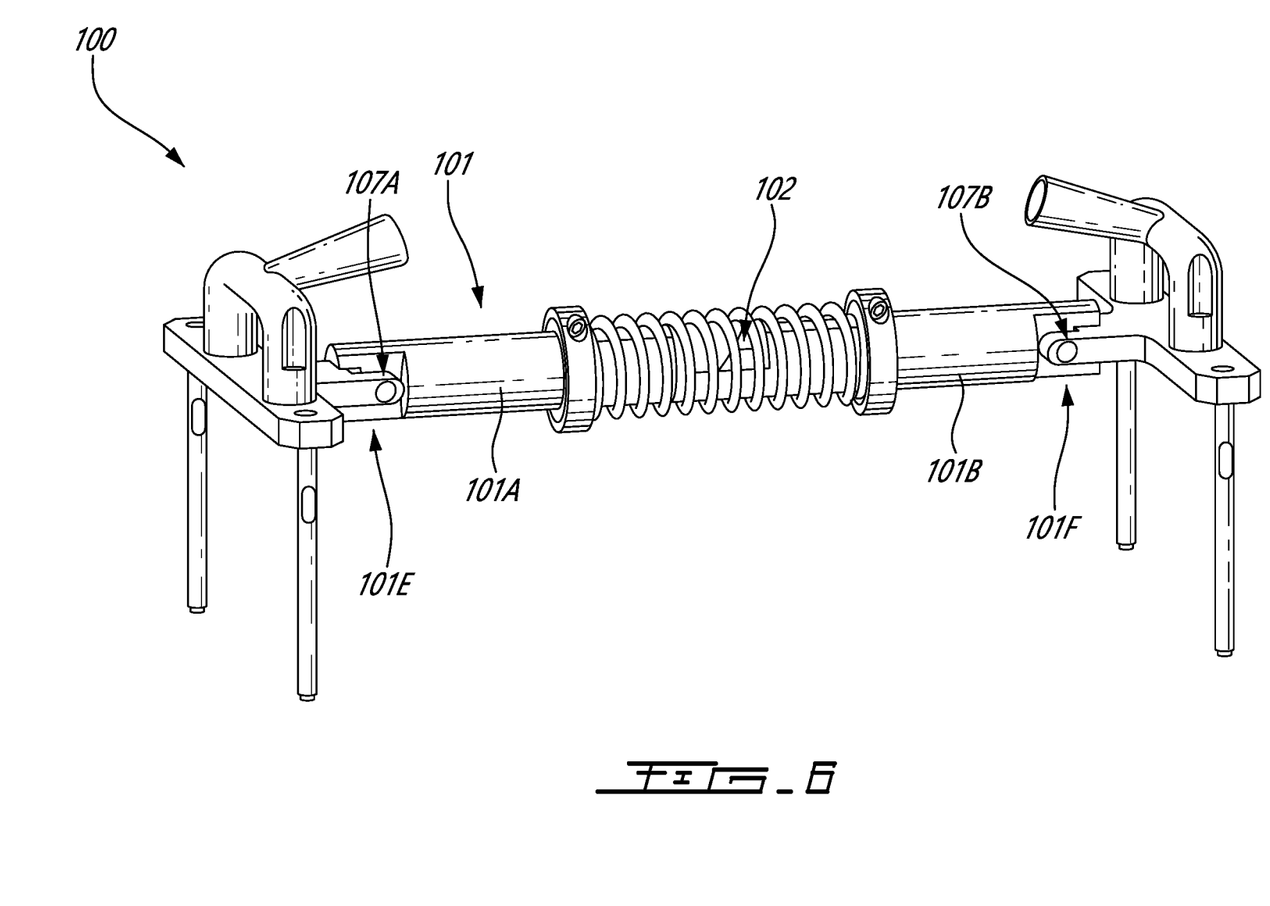
FIG. 6 is a perspective view of the linkage of FIGS. 1 to 3.
Figure 7:
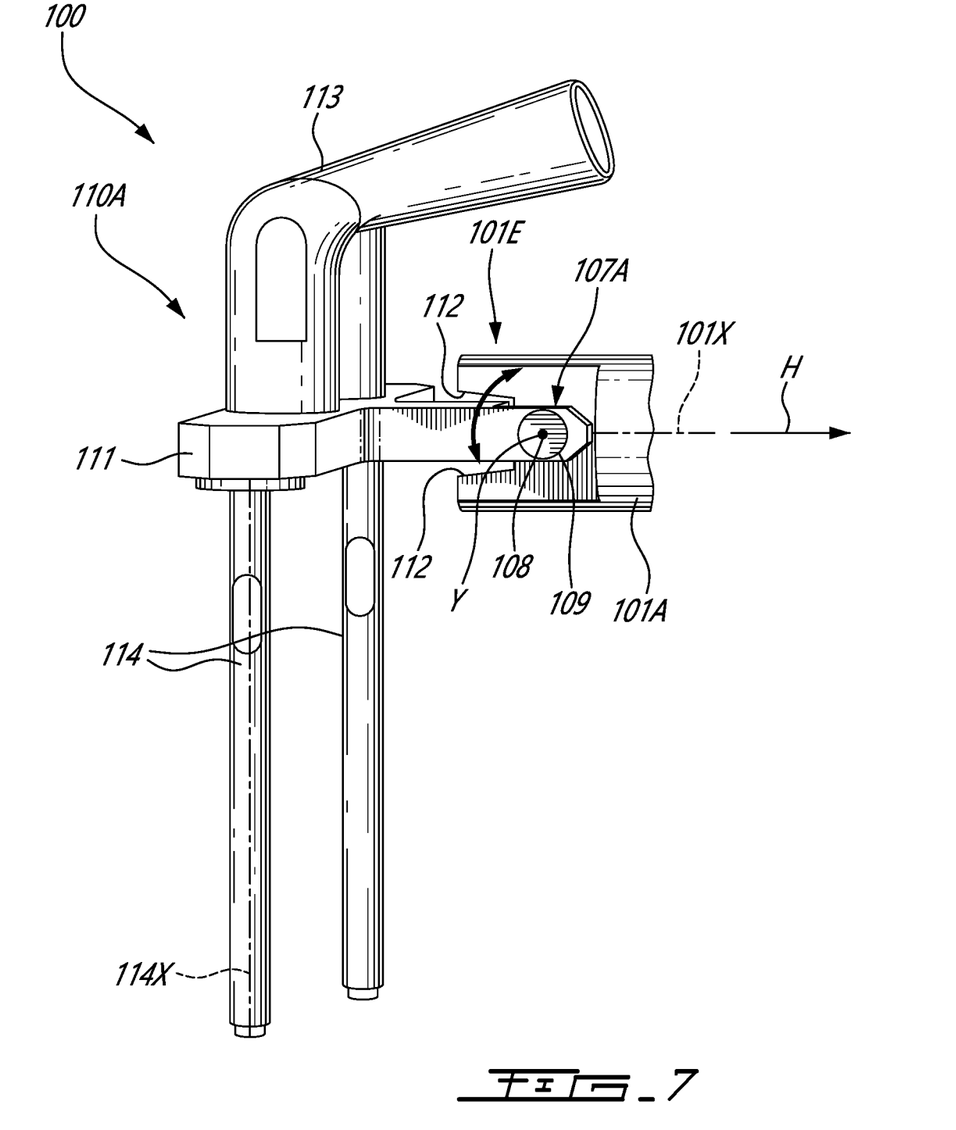
FIG. 7 is a magnified view of a coupling at one end of the linkage of FIGS. 1 to 6.

Referring to FIGS. 6 and 7, a pivot joint 107A, 107B is defined at each of the opposite ends 101E, 101F of the rod 101. A pivot joint of such pivot joints 107A, 107B defines an articulation between the linkage 100 and a trolley 10 connected to the linkage 100. The pivot joints 107A, 107B may allow interconnected trolleys 10a, 10b to move one relative to the other in a direction along the axis Z during hauling. Such articulations and relative movement of the interconnected trolleys 10a, 10b may compensate for unevenness of the ground (e.g. ramps, floor cracks, expansion joints, bumps other asperities) when moving as part of the convoy 1. As shown in FIG. 7, the exemplary pivot joint 107A has a pivot axis 108. The pivot axis 108 extends in a direction transverse to the hauling direction H and/or the longitudinal axis 101X of the rod 101, and transverse to the pivot axis 103. The pivot axis 108 may be referred to as axis Y, normal to the axis Z identified above. In the depicted embodiment, the pivot joint 107A at the end 101E of the rod 101 includes an axle 109. The axle 109 coextends with the pivot axis 108.

The axle 109 defines the rotation axis of the pivot joint 107. The axle 109 may be a bolt, a pin (with or without threads), or other rigid axles. The axle 109 may be part of a rod segment 101A, such as integral therewith, in some embodiments. The axle 109 may support shearing resulting from tension/compression loads in the linkage 100. While described with respect to the pivot joint identified as 107A, the above also applies with respect to the pivot joint 107B, but will not be repeated for conciseness.

The pivot joints 107A, 107B allow a relative movement of the trolleys 10a, 10b relative to the rod 101 in a degree of freedom in rotation normal to that of the degree of freedom in rotation of the pivot joint 102. It may be desirable to block any other degree of freedom at the pivot joints 107A, 107B. This may provide a better control and/or predictability of the trajectory of the convoy 1, and the relative movement of the interconnected trolleys 10a, 10b, during hauling. As such, in the depicted embodiment, the linkage 100 includes the pivot joint 102 with a single degree of freedom in rotation, along the axis Z, and the pivot joints 107A, 107B, with their respective pivot axles 108, at opposite ends of the rod 101, each with a single degree of freedom in rotation, in the axis Y, and all pivot joints 102, 107A. 107B rigid (or substantially rigid, albeit movements due to the manufacturing tolerance between moving parts) in all other degrees of freedom.

Returning to FIG. 3, the linkage 100 includes couplings 110A, 100B located at opposite ends of the linkage 100. Those couplings 110A, 110B are engageable with connecting portions 200A, 200B on opposed facing ends of the trolleys 10a, 10b. The connecting portions 200A, 200B of the trolleys 10A, 10B and the engagement with the couplings 110A, 110B are described later. A representative coupling 110A at one end 101E of the rod 101 will be described with reference to FIG. 7. At least some of the features of the coupling 110B at the other end 101F may be the same, hence those features will not be repeated. The coupling 110A defines part of the pivot joint 107A. As shown, the coupling 110A includes a bracket 111. The bracket 111 is pivotally mounted to the end 101E of the rod at the pivot joint 107A. In the depicted embodiment, the bracket 111 has a T-shape. As shown, the axle 109 extends transversally through the rod segment 101A. The axle 109 interconnects the rod segment 101A and the bracket 111. The bracket 111 is pivotally mounted to the rod segment 101A via the axle 109. The bracket 111 may rotate relative to the rod segment 101A about the pivot axis 108. In the depicted embodiment, the pivot joint 107A allows rotation of the bracket 111 over a limited range of angular positions. In a particular embodiment, the range of angular positions is ±30° (30° clockwise and 30° counterclockwise, ±10°). As shown the pivot joint 107A includes abutment surfaces 112 defined as part of the rod segment 101A. Such abutment surfaces 112 may contact the bracket 111 when the limit of the angular positions is reached. The range of angular positions may be different in other embodiments.

With continued reference to FIG. 7, the linkage 100 may be held by a worker using the handles 113 at opposite ends of the linkage 100, those handles 113 present in at least some embodiments. In the depicted embodiment, the handles 113 form part of the respective couplings 110A, 110B, at opposite ends of the linkage 100. The handles 113 may be held by a worker to manipulate the linkage 100, such as pulling the couplings 110A, 110B to disengage the couplings 110A, 100B from the respective connecting portions 200A, 200B of the trolleys 10a, 10b, and/or align the couplings 110A, 110B with the connecting portions 200A, 200B during installation.

The couplings 110A, 110B include features engageable with complementary features of the connecting portions 200A, 200B. In the depicted embodiment, such a coupling 110A, 110B includes a plurality of pins 114. While in this case the couplings 110A, 110B include a pair of pins 114, there may be one, or more than two pins 114 (e.g. three, four, five), depending on the embodiments. The pins 114 extends from the bracket 111. A longitudinal extent 114X of the pins 114 is normal to the bracket 111. The pins 114 are straight over at least part of, if not all of, their longitudinal extent. The bracket 111 and pins 114 may be formed as a single part or as separate parts secured to each other, by fasteners, welding, adhesive, for instance. The pins 114 may rotate about the pivot axis 108 of the pivot joint 107A, 107B. An angle may vary at the pivot axis 108, between the longitudinal extent of the pins 114 and the longitudinal axis 101X.

Referring back to FIG. 3, the engagement of the couplings 110A, 110B and the connecting portions 200A, 200B of the trolleys will now be described. The linkage 100 is illustrated with the connecting portions 200A, 200B of the trolleys 10a, 10b engageable with respective couplings 110A, 110B at opposite ends of the linkage 100. In the depicted embodiment, the connecting portions 200A, 200B include a pair of tubes 201. While shown with a pair of tubes 201, the connecting portions 200A, 200B of the trolleys 10a, 10b could include only one tube, or more than two tubes (e.g. three, four, five tubes) in other embodiments. The connecting portions 200A, 200B include a number of tubes 201 corresponding to the number of pins 114 of the coupling 110A, 110B to engage respective ones of the pins 114.

Figure 3:
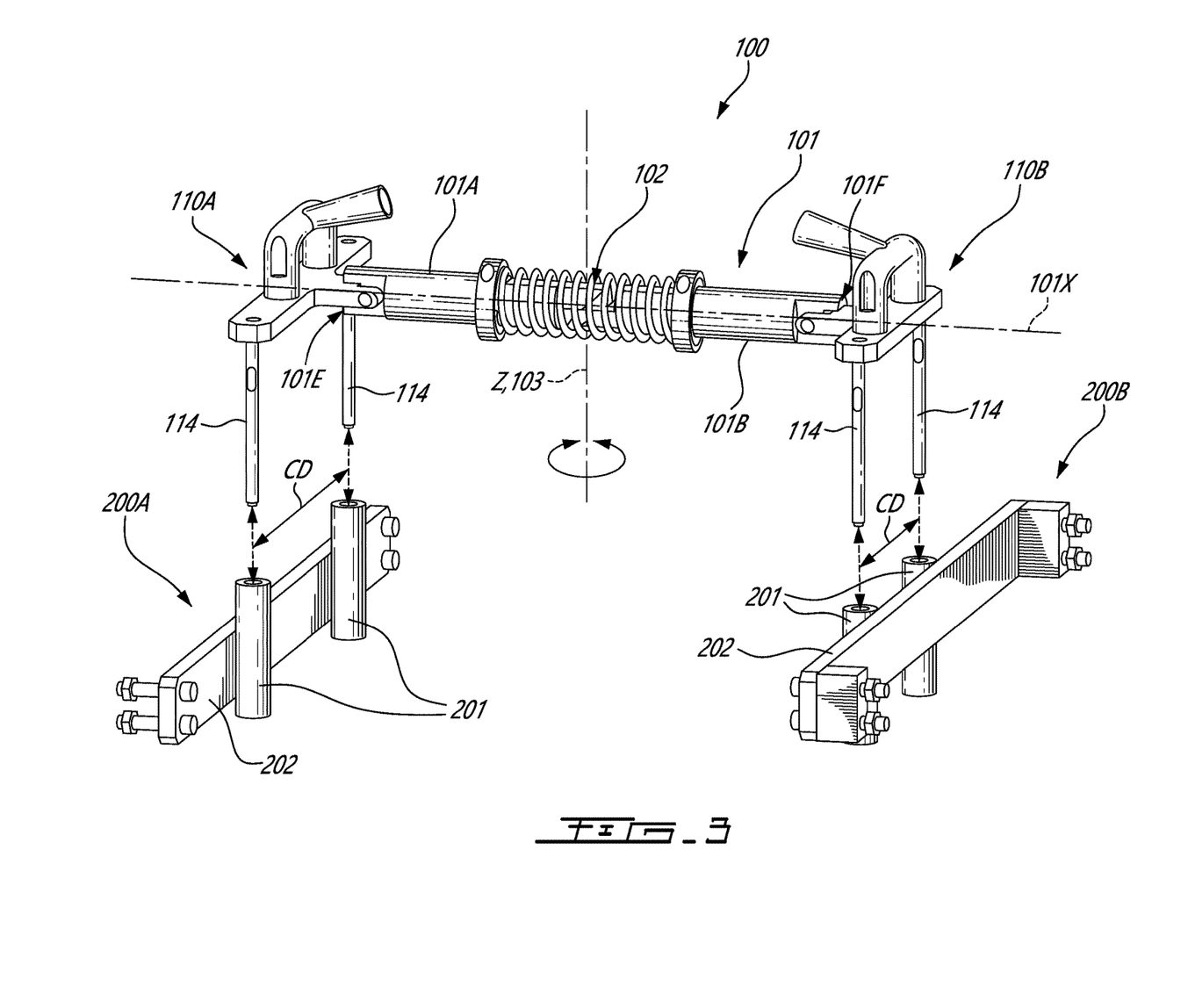
FIG. 3 is an exploded view of the linkage and coupling components of the material handling equipment shown in FIG. 2.

The tubes 201 are mounted on a bracket 202, which may be secured to a frame of one such trolleys 10a, 10b or viewed as part of a trolley itself. Such bracket 202 may vary in dimensions to fit with a specific trolley (e.g. trolleys of different sizes and/or dimensions). In at least some facilities, there may be a standardization of such connecting portions 200 for all types of material handling equipment such as trolley used within the facilities. As such, one linkage 100 may fit on a large number, if not all, of the trolleys 10a, 10b used in those facilities.

In use, the pins 114 of the couplings 110A, 110B each engage a respective one of the tubes 201. The pins 114 engage the tubes 201 in a direction extending along the axis Z, here towards the ground with reference to normal orientation of the trolleys 10a, 10b. A simple "slip-on" axial engagement may thus allow a quick engagement and/or removal of the couplings 110A, 110B from the connecting portions 200A, 200B of the trolleys 10a, 10b. In at least some embodiments, the pins 114 may not be secured axially to the connecting portions 200A, 200B. The pins 114 may be free to move axially through the tube 201. During hauling, the pins 114 and the tubes 201 may allow a slight axial displacement therebetween, depending on the tolerance of the bore of the tubes 201 relative to the periphery of the pins 114. It may be desirable to have a loose fit between the pins 114 and the tubes 201 to facilitate engagement. For instance, a ratio of a diameter of the pins 114 relative to a diameter of the tubes 201 may be between 0.5 and 0.99. A similar ratio of peripheral dimensions may be contemplated regardless of the shape of the pins 114 and tubes 201, which may be square, rectangular, or other geometry in other embodiments.

The pins 114 extend through the tubes 201. The pins 114 are longer than the tubes 201. Having the pins 114 longer than the tubes 201 may provide a visual indicator for the worker to confirm, visually, that the linkage 100 is properly connected to the trolleys 10a, 10b, such as visible in FIG. 2. Forces induced in the linkage 100 and couplings 110A, 110B during hauling (e.g. a combination of lateral forces, torques, etc.) may cause a relative movement of the pins 114 and the tubes 201. The length of the pins 114 may be selected so as to limit disengagement of the pins 114 through the tubes 201 during hauling. Having pins 114 longer than the tubes 201 may also assist in this aspect. However, the pins 114 may be shorter than the tubes 201 in other cases.

The couplings 110A, 110B at each ends of the linkage 100 are different. The couplings 110A, 100B may connect to a respective one of the connecting portions 200A, 200B of the trolleys. In the depicted embodiment, the pins 114, so are the tubes 201, are spaced apart from each other in a lateral direction relative to the hauling direction H (FIG. 1), and/or transverse to the longitudinal axis 101X of the rod 101. As can be seen at least in FIG. 3, a center distance CD between the pins 114 and tubes 201 of the first coupling 110A on one end of the linkage 100 is different than that of the second coupling 110B at the other end of the linkage 100. Such difference may assist in positioning the trolleys 10 in the convoy 1 in a same orientation. As discussed above, the trolleys 10 may have a set of swivel casters 11a and a set of fixed casters 11b. It may be desirable to have all trolleys 10 of the convoy 1 with their respective set of swivel casters 11a at the front of the trolleys, i.e. towards the front of the convoy 1 relative to the fixed casters 11b. This may facilitate steering of the convoy 1 more smoothly in a curved trajectory and/or stabilize the trajectory of the convoy 1 during hauling. The trolleys 10a, 10b of the convoy 1 may each have a first connecting portion 200A at a front of the trolley, and a second connecting portion 200B at a rear of the trolley, with the first and second connecting portions 200A, 200B having the tubes 201 at a different center distance. As such, a worker linking trolleys 10a, 10b with one or more linkages 100 in a convoy 1 may more easily identify on which side the trolleys 10a, 10b are positioned. Having a different coupling 110A, 110B one each side of the linkage 100 with correspondingly different connecting portions 200A, 200B at the front versus the rear of trolleys 10a, 10b may define a mistake proof and/or a visual trolley-orienting feature to assist the workers when assembling a convoy 1 of trolleys 10.

Figure 8:
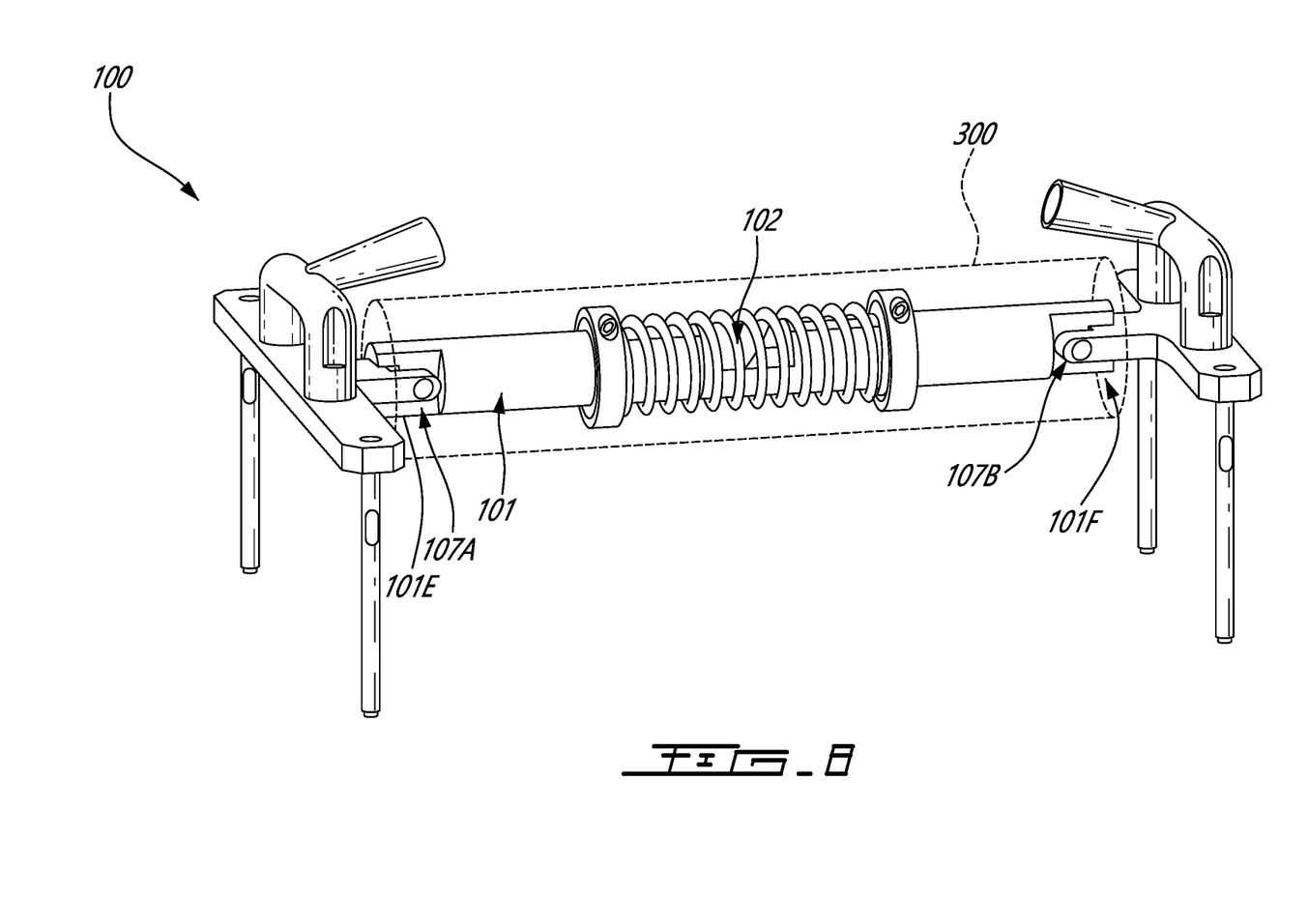
FIG. 8 is a perspective view of the linkage of FIGS. 1 to 7, according to an embodiment.

Referring to FIG. 8, in at least some embodiments, such as shown, the linkage 100 may include a protective sleeve 300 extending along, and about, the rod 101. Such sleeve 300 is flexible. In an embodiment, the sleeve 300 may be water repellant and/or waterproof, dust proof, etc. In an embodiment, the sleeve 300 is a nylon sleeve. The sleeve 300 overlays at least the components of the pivot joint 102 to shield the pivot joint 102 from dust, debris, water, or other potential contaminants which may on the long run affect the integrity of the pivot joint 102. The sleeve 300 may also prevent, or at least limit, contact, pinching, etc., of the worker's fingers/hands during handling, between movable components. As shown, the sleeve 300 extends along a substantial (95%) portion, or an entirety of the rod 101. In at least some embodiments, such as shown, the sleeve 300 may cover the pivot joints 107A, 107B at the opposite ends 101E, 101F of the rod 101. The sleeve 300 may include hook-and-loop fasteners or other types of fastener to easily wrap on and/or unwrap the sleeve 300 from about the rod 101. The sleeve 300 may be a tubular sleeve, without fasteners in other cases.

Figure 9:
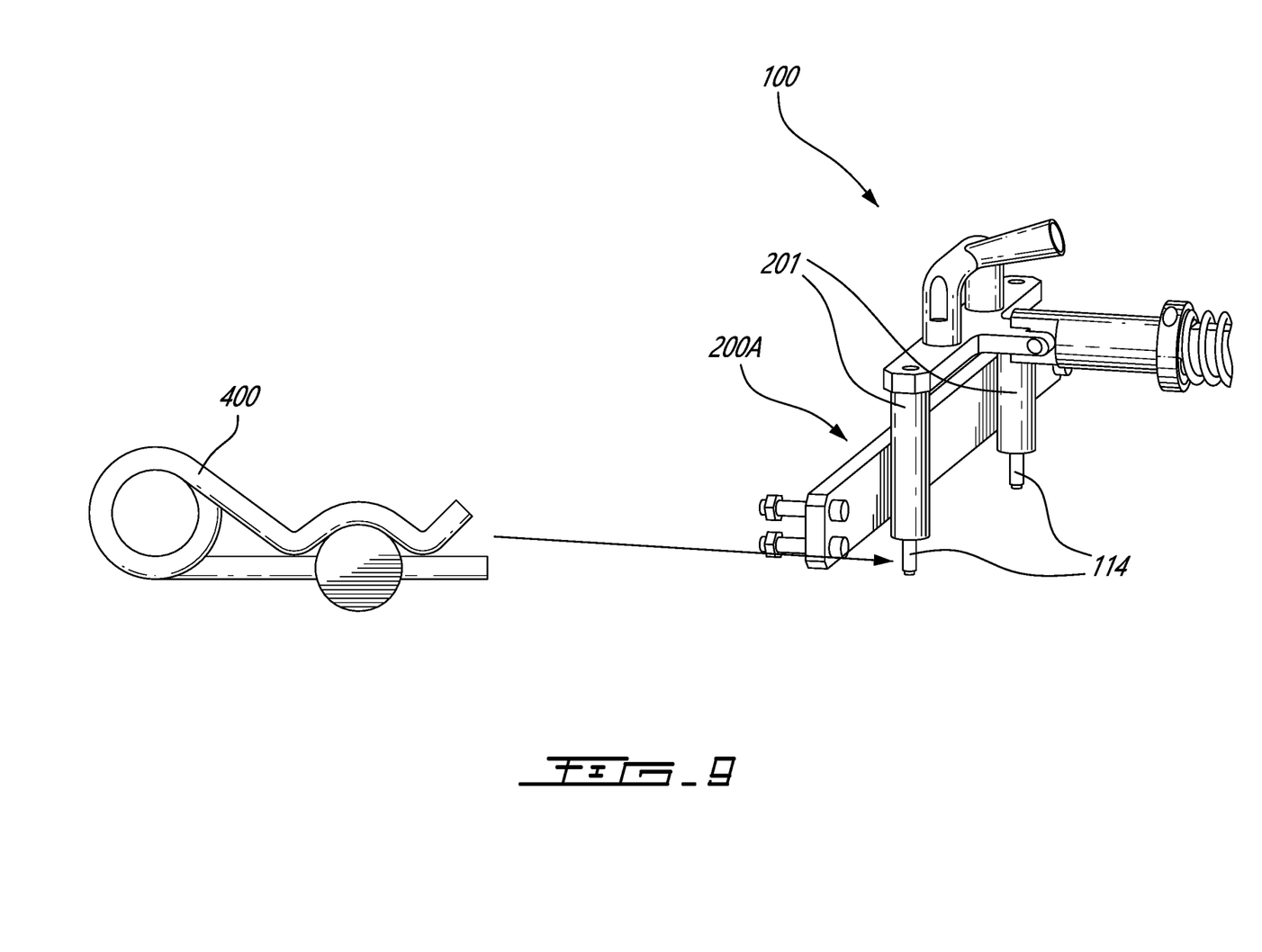
FIG. 9 is a partial view of an end portion of the linkage.

Referring to FIG. 9, in at least some embodiments, the couplings 110A, 110B may be further secured to the associated connecting portions 200A, 200B using a releasable locking device 400, for instance a pin clip, fastener, lock, etc. As shown, a locking device 400, here illustrated as a pin clip, may connect to an end of one or more of the pins 114, which may prevent accidental disengagement of the pins 114 from the tubes 201.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, other configurations allowing connection of the couplings 110A, 110B and the connecting portions 200A, 200B of the trolleys 10a, 10b may be contemplated. While the couplings 110A, 110B and connecting portions 200A, 200B are illustrated as a pin and tube arrangement, other coupling members adapted to connect to a respective trolley with complementary connecting members may be contemplated. For instance, other male-female engagement features may be contemplated, and/or complementary features to connect the linkage 100 to the trolleys 10a, 10b. For instance, a clamp or grip member and bracket arrangement, including a bracket or other attachment member at opposite ends of the rod 101 for engaging a member of the frame of a trolley and securing the linkage 100 to the trolley, at least in the hauling direction H, may be contemplated.

Yet further modifications could be implemented by a person of ordinary skill in the art in view of the present disclosure, which modifications would be within the scope of the present technology.

The invention claimed is:

1. A convoy of material handling equipment displaceable on a floor in a hauling direction, the convoy comprising:
  a first material handling equipment and a second material handling equipment each having floor contacting components for displacement on the floor, the first material handling equipment and the second material handling equipment each having a first connecting portion on a first side and a second connecting portion on a second side opposite the first side; and
  a linkage interconnecting the first material handling equipment and the second material handling equipment via the first connecting portion on the first material handling equipment and the second connecting portion on the second material handling equipment, the linkage including:
    a rod having a first end and a second end opposite the first end, a first pivot joint defined between the first end and the second end, the first pivot joint having a first pivot axis extending transversely to a longitudinal axis of the rod and the floor, a first rod segment and a second rod segment of the rod are pivotally coupled to each other by the first pivot joint;
    a biasing member secured to the first rod segment and to the second rod segment, the biasing member being tubular and extending around the first pivot joint, along a periphery of the first rod segment and the second rod segment, the biasing member having a first portion overlying peripherally at least part of the first rod segment and a second portion overlying peripherally at least part of the second rod segment, the biasing member deformable by bending in a direction transverse to the hauling direction and the longitudinal axis of the rod upon rotation of the first pivot joint about the first pivot axis, the biasing member at least partially resisting to the rotation of the first pivot joint about the first pivot axis upon bending the first portion relative to the second portion as the first rod segment pivot relative to the second rod segment; and a first coupling and a second coupling respectively pivotally mounted to the first end and the second end of the rod for rotation about a second pivot axis and a third pivot axis, the second pivot axis and the third pivot axis extending in a parallel direction that is transverse to both the longitudinal axis of the rod and the first pivot axis, the first coupling and the first connecting portion of the first material handling equipment removably engaged together, the second coupling and the second connecting portion of the second material handling equipment removably engaged together, wherein the first material handling equipment and the second material handling equipment are displaceable with respect to one another in a direction parallel with the first pivot axis, the first coupling and the second coupling pivoting respectively about the second pivot axis and the third pivot axis upon relative displacement of the first material handling equipment and the second material handling equipment in the direction parallel with the first pivot axis.

2. The convoy as defined in claim 1, wherein the pivot axis of the first pivot joint is located at an equal distance from the second pivot axis and the third pivot axis.

3. The convey as defined in claim 1, wherein the first pivot joint includes an axle coextending with the first pivot axis, the axle connects the first rod segment and the second rod segment of the rod at an interface between the first rod segment and the second rod segment, the second pivot axis and the second pivot axis defined by a second pivot joint and a third pivot joint each including an axle, the axles of the second pivot joint and the third pivot joint coextending with a respective one of the second pivot axis and the third pivot axis.

4. The convoy as defined in claim 1, wherein the first pivot axis is normal to the second pivot axis and the third pivot axis, the second pivot axis and the third pivot axis are normal to the hauling direction.

5. The convoy as defined in claim 1, wherein the first coupling includes a plurality of pins extending from the bracket of the first coupling and the second coupling includes a plurality of pins extending from the bracket of the second coupling, the plurality of pins of the first coupling spaced apart from each other in a direction extending along the second pivot axis, the plurality of pins of the second coupling spaced apart from each other in a direction extending along the third pivot axis, wherein a center distance between the plurality of pins of the first coupling is different than that of the plurality of pins of the second coupling.

6. The convoy as defined in claim 1, wherein the first coupling and the first connecting portion define a male-female connection, the first coupling is in axial engagement with the first connecting portion in a direction extending along the first pivot axis, transverse to the floor.

7. The convoy as defined in claim 6, wherein the first coupling includes one of a plurality of pins and a plurality of tubes for receiving the plurality of pins, and the first connecting portion includes another one of the plurality of pins and the plurality of tubes.

8. The convoy as defined in claim 1, wherein the biasing member is a coil spring, the coil spring having a first end and an opposite second end, the first end secured at least axially to the first rod segment and the second end secured at least axially to the second rod segment.

9. The convoy as defined in claim 1, wherein the longitudinal axis of the biasing member extends from a first end of the biasing member to an opposite second end of the biasing member, the longitudinal axis of the biasing member intersecting with the first pivot axis.

10. The convoy defined in claim 1, wherein the first rod segment and the second rod segment are pivotable relative to each other over a limited range of angular positions, wherein the limited range of angular positions is between 0° and 90°.

11. The convoy as defined in claim 1, wherein the second pivot axis and the third pivot axis are defined respectively by a second pivot joint and a third pivot joint, the second pivot joint and the third pivot joint are defined at a respective end of the first rod segment and of the second rod segment, wherein the first pivot joint, the second pivot joint and the third pivot joint each have a single degree of freedom in rotation, wherein all other degrees of freedom at the first pivot joint, the second pivot joint and the third pivot joint are blocked.

12. The convoy as defined in claim 1, further comprising a flexible sleeve extending along and about the rod, the sleeve overlying the biasing member.

13. The convoy as defined in claim 1, wherein the first coupling and the second coupling each include a bracket, the bracket of the first coupling and the bracket of the second coupling respectively pivotally mounted to the first end and the second end of the rod to rotate respectively about the second pivot axis and the third pivot axis, wherein the first coupling and the second coupling each include at least one pin extending from their respective brackets, the first connecting portion and the second connecting portion each include at least one tube for engaging the at least one pin of respective ones of the first coupling and the second coupling, the at least one tube of the first connecting portion and the second connecting portion extending respectively along the first side of the first material handling equipment in a direction normal to the floor and along the second side of the second material handling equipment in the direction normal to the floor.

14. The convoy as defined in claim 1, further comprising handles at opposite ends of the linkage, the handles forming respective parts of the first coupling and the second coupling.

15. A convoy of material handling equipment displaceable on a floor in a hauling direction, the convoy comprising:
a first material handling equipment and a second material handling equipment each having floor contacting components for displacement on the floor, the first material handling equipment and the second material handling equipment each having a frame, a first connecting portion on a first side of the frame and a second connecting on a second side of the frame opposite the first side; and
a linkage interconnecting the first material handling equipment and the second material handling equipment via the first connecting portion on the first material handling equipment and the second connecting portion on the second material handling equipment, the linkage including:
a rod having a first end and a second end opposite the first end, a first pivot joint defined between the first end and the second end, the first pivot joint having a first pivot axis extending transversely to a longitudinal axis of the rod and to the floor, a first rod segment and a second rod segment of the rod are pivotally coupled to each other by the first pivot joint;

a biasing member secured to the first rod segment and to the second rod segment, the biasing member being tubular and extending around the first pivot joint, along a periphery of the first rod segment and the second rod segment, the biasing member having a first portion overlying peripherally at least part of the first rod segment and a second portion overlying peripherally at least part of the second rod segment, the biasing member deformable in a direction transverse to the longitudinal axis of the rod upon rotation of the first pivot joint about the first pivot axis, the biasing member at least partially resisting to the rotation of the first pivot joint about the first pivot axis upon bending the first portion relative to the second portion from a first angular position to a second angular position of the first rod segment relative to the second rod segment; and a first coupling and a second coupling respectively pivotally mounted to the first end and the second end of the rod for rotation about a second pivot axis and a third pivot axis, the second pivot axis and the third pivot axis transverse to the longitudinal axis of the rod and the first pivot axis, the first coupling and the second coupling including features engageable with complementary features of respective ones of the first connecting portion on the first material handling equipment and the second connecting portion on the second material handling equipment;

wherein the first material handling equipment and the second material handling equipment are displaceable with respect to one another in a direction along the first pivot axis upon pivoting the first coupling about the second pivot axis and the second coupling about the third pivot axis.

\* \* \* \* \*